Figure 1:
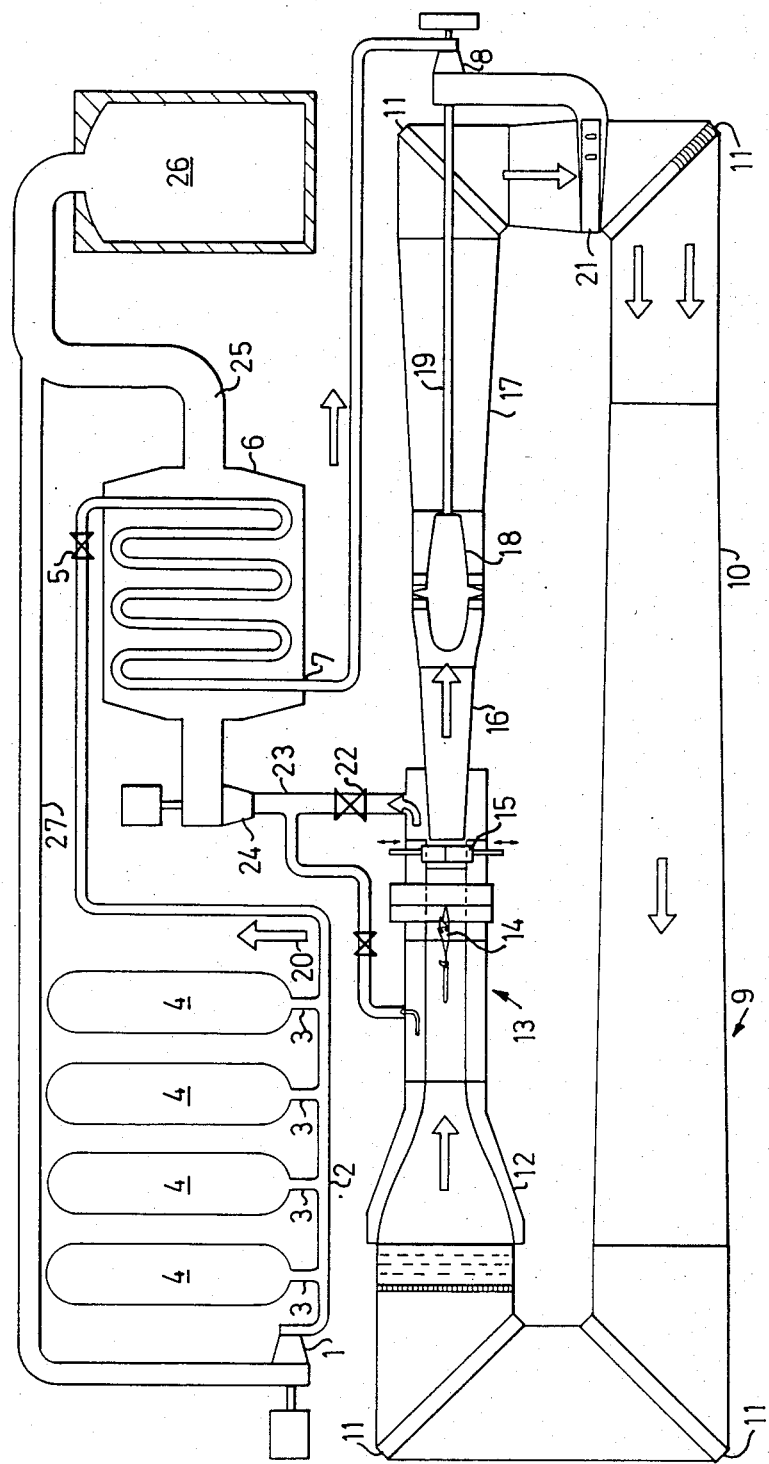

United States Patent [19]

Nelander

[11] Patent Number: 4,513,610
[45] Date of Patent: Apr. 30, 1985

[54] METHOD AND DEVICE FOR ATTAINING A GAS FLOW IN A WIND TUNNEL

[75] Inventor: Curt Nelander, Spånga, Sweden

[73] Assignee: AB Rollab, Sweden

[21] Appl. No.: 550,448

[22] Filed: Nov. 10, 1983

[30] Foreign Application Priority Data

Sep. 6, 1983 [SE] Sweden ................................. 8304780

[51] Int. Cl.³ ............................................. G01M 9/00
[52] U.S. Cl. ..................................................... 73/147
[58] Field of Search ........................................... 73/147

[56] References Cited

U.S. PATENT DOCUMENTS 3,111,842  11/1963  Fredette et al. ......................... 73/147

FOREIGN PATENT DOCUMENTS 712847  10/1941  Fed. Rep. of Germany ........ 73/147
312164   5/1972  U.S.S.R. ................................. 73/147

Primary Examiner—Donald O. Woodiel
Attorney, Agent, or Firm—Ostrolenk, Faber, Gerb & Soffen

[57] ABSTRACT

Method and device for attaining a gas flow in a wind tunnel whereby a flow medium, preferably air, is caused to flow from a pressure storage (4) via a turbine (8) to a wind tunnel (9). The turbine (8) is arranged to drive a fan (18) positioned in the wind tunnel (9), and a partial flow of the medium flowing in the wind tunnel (9) is deflected from the wind tunnel circuit, whereas the main part is recycled and mixed with the flow being successively fed from the turbine (8).

7 Claims, 3 Drawing Figures

METHOD AND DEVICE FOR ATTAINING A GAS FLOW IN A WIND TUNNEL

The present invention relates to a method and a device for attaining a gas flow in a wind tunnel, preferably for air at transonic speed and under cryogenic operation conditions.

Ever since wind tunnel technology started, the question had to be decided which type of driving system would be best suited for a planned project. The choice had mainly to be made between a fan-driven tunnel with return circuit, an ejector tunnel, or a blow-down tunnel driven from a compressed air storage or towards an evacuated container. Important conditions in designing a wind tunnel are, firstly, dimensions of the tunnel and speed range, secondly, its performance in the form of attainable Reynold's number, and the power consumption of the facility.

In order to reduce the power required and obtain high Reynold's numbers, a use of heavy gases with low sonic speed has been suggested. Another concept has been to use cooled air, which besides a low sonic speed also means a low viscosity.

In known plants with a continuous fan-driven tunnel, liquid nitrogen has been used for cooling the flow down to cryogenic operation conditions. The liquid nitrogen has been injected directly into the tunnel to cool off the temperature rise imposed by the fan. This type of wind tunnel requires, however, large power installations and uses considerable quantities of liquid nitrogen, so the operating costs are high.

In known facilities of blow-down type a compressed air storage was loaded a rather long time thus reducing the charge on the power distribution network and then used later on in the intermittent operation of the wind tunnel. Liquid nitrogen was also used here for cooling, whereby considerable quantities were consumed. The economy of the blow-down tunnel due to moderate-power installation in comparison with the continuous fan-driven tunnel is, however, offset in high Reynold's number, operation by the fact that the high pressurized and cold air flow is dumped directly into the atmosphere. The blow-down tunnel has even other drawbacks, such as short testing times causing a wrong model temperature, environment problems in the form of noise and vapour clouds at the outlet, and finally, problems with the condensation of atmospheric air on the cold tunnel walls. These disadvantages have led to the result that the only large plant of this type recently was closed down.

The present invention is aimed to achieve a considerable improvement in operation economy in comparison with earlier known wind tunnels and simultaneously to attain high Reynold's numbers. This is according to the present invention obtained thereby that a flow medium, preferably air, is caused to flow from a pressure storage via a turbine into the wind tunnel, that the turbine is arranged to drive a fan positioned in the wind tunnel, and that a partial flow of the medium flowing in the wind tunnel is deflected from the wind-tunnel circuit, whereas the main part is recycled and mixed with the flow being successively fed from the turbine.

By the proposed turbine propulsion, a moderate primary power installation can bring about that a secondary high power is developed in the fan, which is necessary for compressing the recycled flow in the wind tunnel. The expansion in the turbine causes a substantial enthalpy drop, thus an effective cooling of the gas takes place which thereby can be used for cooling down the increase in temperature caused by the compression work of the fan in the wind tunnel. The outlet air from the turbine is hereby directly introduced into the tunnel circuit and preferably so far from the nozzle that the flow will not be disturbed in the test section. A corresponding quantity is deflected before the fan and brought to heat exchange with the flow streaming from the pressure storage.

Owing to the fact that the driving gas for the turbine propulsion is merely a certain portion of the flow in the wind tunnel, the running time may be considerably extended in comparison with a conventional blow-down operation. The consumption of liquid nitrogen in the case of turbine propulsion will be used to precool the matrix heat exchanger only and thus reduced to just a fraction of the amount used for conventional cryogenic operation.

In order to reduce environmental problems and improve operational conditions, the deflected part of the medium flow may be collected in a tank, or the like, preferably in an initially evacuated rock chamber.

The other features characterizing the invention can be seen from the characteristics defined in the attached claims.

Figure 2:
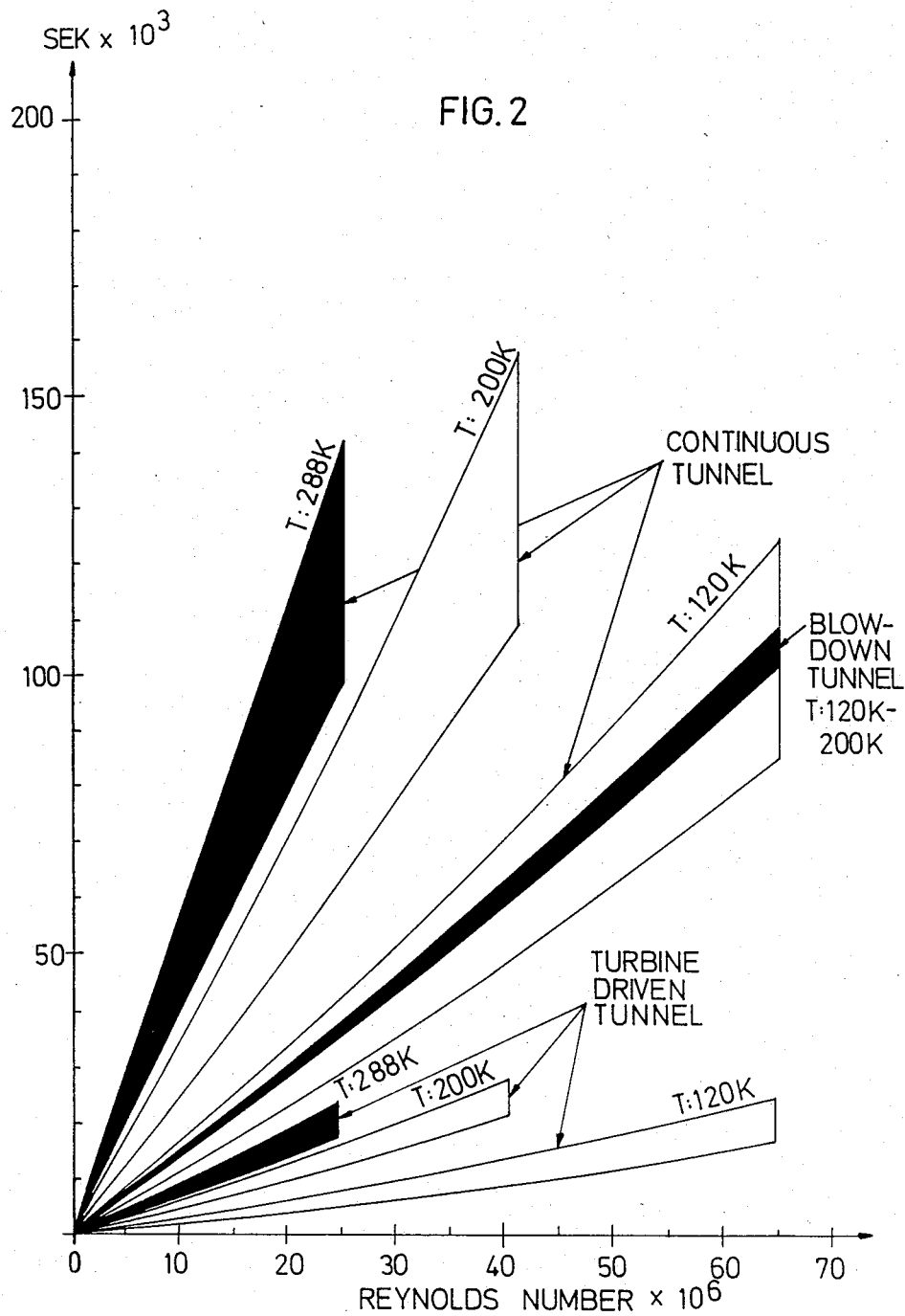
Figure 3:
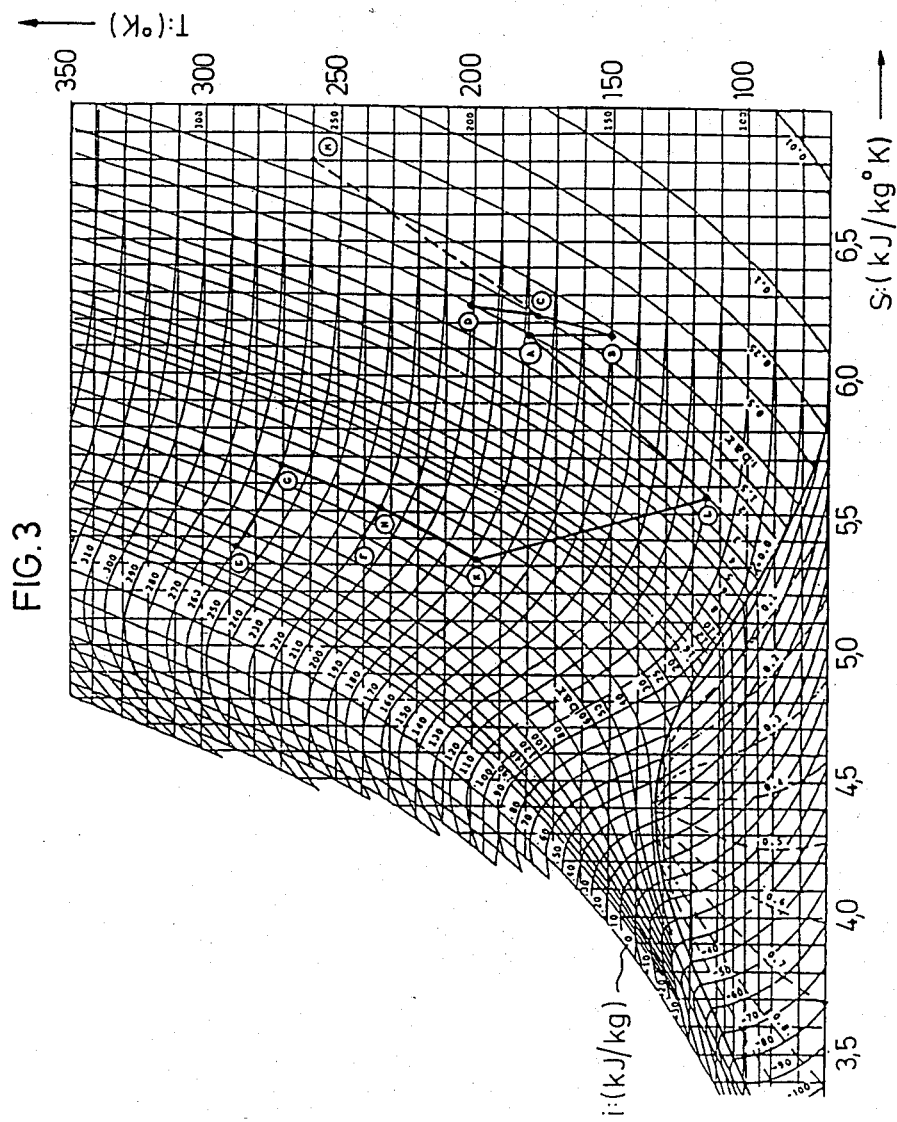

The invention is described in detail in connection with the attached drawings, however, without being restricted to the shown example where FIG. 1 schematically shows the design of a wind tunnel according to the invention, FIG. 2 shows an energy cost graph for the operation of different wind tunnels and FIG. 3 shows a temperature-entropy graph for air, wherein the thermodynamic process in a suitable operation case according to the present invention is illustrated.

In the plant shown in FIG. 1 a compressor is designated by 1. The compressor 1 is intended for loading via a manifold 2 and pertinent branch connections 3, a number of—in the shown example—four containers 4. These four containers form a device which in the following is called pressure storage. The said pressure storage is via a pipe provided with a control valve 5, connected to a matrix heat exchanger 6 arranged to be cooled down, and the outlet 7 of the said heat exchanger is by a pipe connected to a turbine 8, having an outlet that opens into the wind tunnel itself, which generally is designated by 9 and in customary manner comprises a diffuser 10, guiding vanes 11, a nozzle 12, a test section 13, a model support 14, a choke mechanism 15, diffusers 16 and 17. A fan 18 is positioned in the return circuit and arranged to be driven by the turbine 8 via the shaft 19.

The plant shown in FIG. 1 functions in principle in the following manner. In operation the stored compressed air is caused to flow from the pressure storage 4 in the direction of the arrow 20, i.e. via the control valve 5, through the precooled matrix heat exchanger 6 to the turbine 8. The compressed air, which in this manner has been cooled down to a suitable temperature, is hereby caused to expand in the turbine 8 and the power generated is conveyed to the turbine shaft 19 for driving the fan 18 whereby, due to the released energy, the air temperature is further decreased by the turbine passage. The air having been cooled down in this way is subsequently introduced into the wind tunnel 9 through the inlet 21 and mixed with the main flow of the tunnel. The total mass flow passes in the usual manner the guiding vanes 11, the nozzle 12, the model 14 and the choke mechanism 15. After having passed the test section 13 the main part of the air flow is returned via a diffuser 16 and 17 wherein the fan 18, which by the turbine shaft 19 is connected to the turbine 8, is arranged to increase the pressure and hereby compensate the pressure drops in the tunnel circuit. The increase in temperature of the flow caused by the compression in the fan 18 is compensated by an adapted feeding of the cold air from the turbine outlet through the inlet 21.

The same amount of air flow is after the choke mechanism 15 deflected from the tunnel circuit and used to cool the matrix heat exchanger 6, which is achieved by a pipe 23 being provided with a valve 22 and connected to the said matrix heat exchanger 6. This conduit can possibly be arranged to include a turbine 24, so that hereby the temperature can be further reduced. After passing the matrix heat exchanger 6, the flow exits through an outlet channel 25, which may end in the atmosphere but preferably in an evacuated tank 26, e.g. in the form of a rock chamber or the like. Environmental problems in the form of fog and noise are avoided hereby. The tank 26 can also serve as an accumulator when valuable gases are used as flow medium instead of air, whereby a pipe line 27 can be suitably connected between the tank 26 and the compressor 1.

FIG. 2 shows a graph, wherein the energy cost is depicted as a function of Reynold's number and the temperature for different wind tunnel alternatives. The energy cost is calculated per day for 1000 seconds running time for a continuous fan-driven tunnel, or for the turbine-driven tunnel proposed according to the present invention and for 100 seconds running time of a conventional blow-down tunnel. The efficiency factor of the continuous or the turbine-driven tunnel has been varied between 0.4–0.6. It can be seen from the graph that the power costs of the turbine operation proposed by the present invention in all the cases are lower than those of earlier known wind tunnel plants.

FIG. 3 shows a temperature-entropy graph for air, whereby the thermodynamic process of a suitable operation case according to the present invention is illustrated, wherein

| | |
|---|---|
| A | shows the state before the nozzle 12 |
| B | shows the state in the test section 13, |
| C | shows the state after the diffuser 16, |
| D | shows the state after the fan section 18, |
| E & F, resp | shows the state in the compressed air storage 4 at the beginning and the end, resp of the running time |
| G & H, resp | shows the state after the control valve 5 at the beginning and the end, resp of the running time, |
| K | shows the state after the matrix heat exchanger 6, |
| L | shows the state after the turbine 8, and |
| M | shows the state in the outlet channel 25. |

The expansion in the nozzle 12 occurs from A to B with a mass flow of, for instance, 4 ṁ. Between B and C ṁ is, for example, deflected and the remaining 3 ṁ is compressed in the fan 18 from C to D. The deflected mass flow ṁ is caused to pass through the matrix heat exchanger 6 and the outlet 25 where the state M is attained. From the compressed air storage 4 the pressure is reduced, e.g. to 4 MPa (40 bars) in the control valve 5 between E-G and F-H, resp. This flow which amounts to ṁ is cooled in the matrix heat exchanger 6 from between G and H to the point K. The matrix heat exchanger 6 is regenerated by the deflected partial flow with a temperature difference of at least 20 K, which is possible due to the Joule-Thomson effect. This is a process that corresponds to Claude's process for producing liquid air.

The enthalpy in point K corresponds to the stagnation enthalpy in the wind tunnel. After the matrix heat exchanger 6 the flow ṁ, is introduced into the turbine 8 supposed to have an efficiency of 0.8. With this assumption and owing to the fact that the enthalpy decrease in the turbine 8 must be three times larger than the enthalpy increase in the fan due to the mass flow ratio, the expansion takes place from K to L. After the turbine the flow ṁ is mixed (from state L to A) with the flow 3 ṁ in the wind tunnel, whereby this flow is cooled from D to A.

The invention is of course not restricted to the embodiment shown in the example illustrated by the drawing and may be varied in many ways within the scope of the following claims.

I claim:

1. Method of attaining a gas flow in a wind tunnel, characterized in that a flow medium, preferably air, is caused to flow from a pressure storage (4) via a turbine (8) into the wind tunnel (9), that the turbine (8) is arranged to drive a fan (18) positioned in the wind tunnel (9), and that a partial flow of the medium flowing in the wind tunnel (9) is deflected from the wind-tunnel circuit, whereas the main part is recycled and mixed with the flow being successively fed from the turbine (8).

2. Method according to claim 1, characterized in that the deflected partial flow is heat exchanged with the flow originating from the pressure storage (4).

3. Method according to claim 1 or 2, characterized in that the deflected partial flow is collected in a tank (26) or the like, preferably in an initially evacuated rock chamber.

4. Device for attaining a gas flow in a wind tunnel for carrying out the method according to claim 1, characterized in that a pressure storage (4) intended for the flow medium is arranged to feed the said flow medium via a turbine (8) to the wind tunnel (9), and that a fan (18) present in the wind tunnel (9) and driven by the said turbine (8) is arranged to recycle the main part of the flow medium within the wind tunnel (9).

5. Device according to claim 4, characterized in that a heat exchanger (6) positioned between the pressure storage (4) and the turbine (8) is arranged to be fed with a low-temperature partial flow deflected from the wind tunnel (9).

6. Device according to claim 4 or 5, characterized by a tank (26), preferably in the form of an initially evacuated rock chamber, for collecting the said partial flow after its passage through the matrix heat exchanger.

7. Device according to claim 6, characterized in that the tank (26) by a pipe line (27) is connected to a compressor (1) feeding the pressure storage (4).

* * * * *